July 1, 1941.  R. F. RUTHRUFF  2,247,820
MANUFACTURE OF GEL-TYPE METALLIC OXIDE CATALYSTS
Filed Sept. 13, 1939
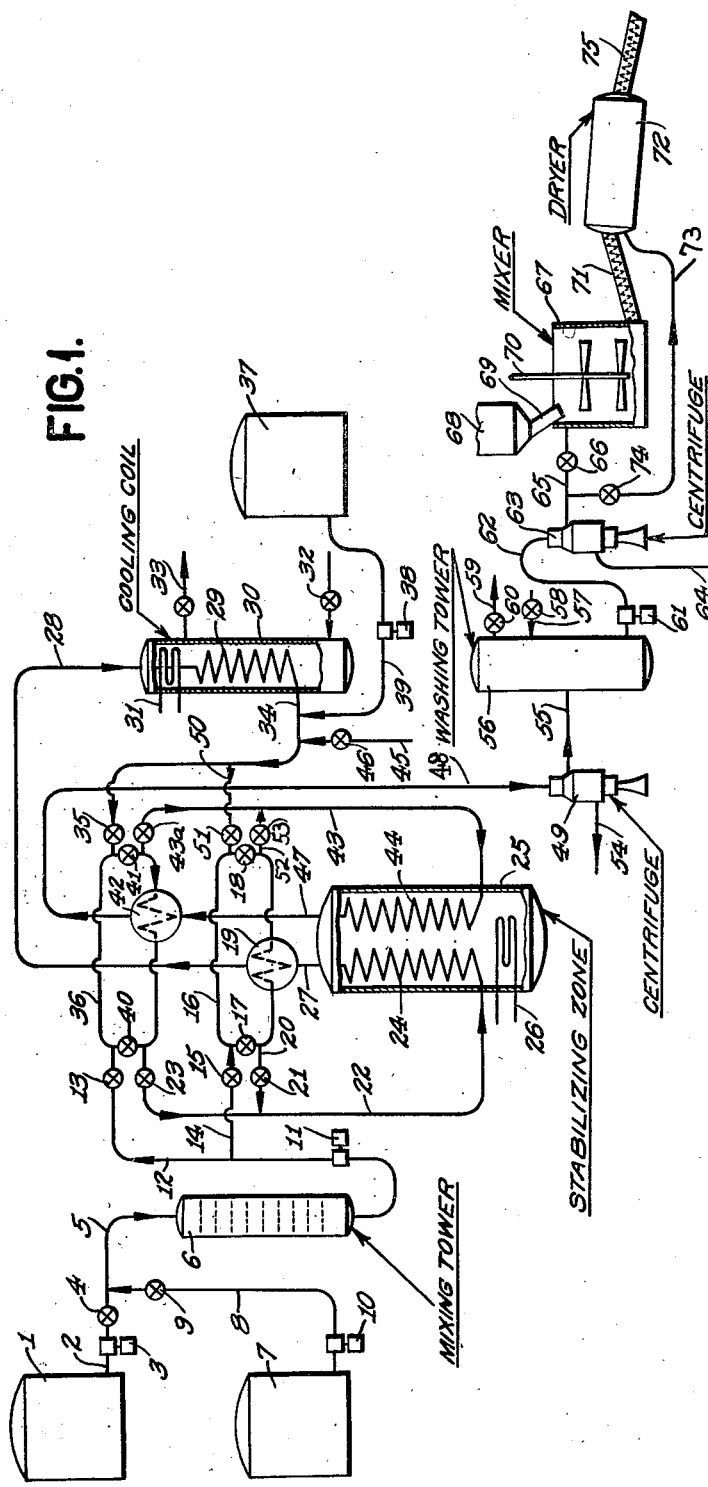
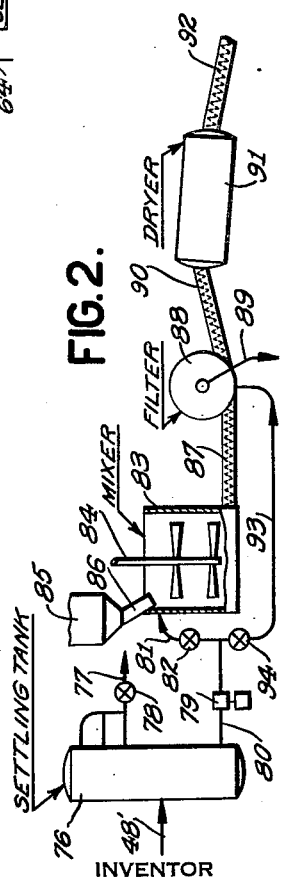
INVENTOR
ROBERT. F. RUTHRUFF
BY
E. J. Liebrecht
ATTORNEY Patented July 1, 1941

2,247,820

UNITED STATES PATENT OFFICE 2,247,820

MANUFACTURE OF GEL-TYPE METALLIC OXIDE CATALYSTS

Robert F. Ruthruff, Nutley, N. J., assignor to Process Management Company, Inc., New York, N. Y., a corporation of Delaware Application September 13, 1939, Serial No. 294,574

9 Claims. (Cl. 23—145)

This invention relates to the preparation of catalytic material and particularly to a continuous process for the production of a chromium oxide catalyst of high activity.

Although my present invention is applicable to the production of a variety of catalytic materials, it is especially applicable to the production of chromium oxide catalysts of the oxide gel type, particularly suited to the conversion of hydrocarbons at elevated temperature, such as the modification of the hydrogen to carbon ratio of the hydrocarbons treated.

In preparing oxide gel-type catalysts by precipitating the metal as the corresponding oxide reaction product from concentrated aqueous solution of a salt of the metal it is found that the activity of catalysts so prepared is impaired by the presence of occluded salts which it is difficult if not impossible to remove by prolonged washing. The use of dilute solutions of the salt of the metal to obtain the desired type of catalyst is made impractical by long and laborious operations. Such methods available heretofore, furthermore involve batch operations producing comparatively small quantities of the prepared catalyst.

It is an object of my invention to provide a continuous process for the production of a chromium oxide catalyst substantially free of occluded salts, which continuous process obviates the protracted procedure of methods heretofore available.

In accordance with the process of my invention there is formed an aqueous solution of a chromium compound containing a stabilizer for the chromium, the stabilizer being present in sufficient amount to delay, but not inhibit, the precipitation of chromium from its solution upon alkalization of the solution at normal temperature.

The conversion of the solution to the stable state in the presence of the stabilizer requires hours of standing at normal temperatures. Stabilization can, however, be brought to completion rapidly by maintaining the solution containing the stabilizer at the boiling point for a short period of time, for example not exceeding one minute. In my process the solution containing the stabilizer, is therefore passed in continuous stream through a heating zone wherein it is heated to, and maintained at, the boiling point for a period of time not exceeding, for example, about one minute. The stream of stabilized solution is cooled to a temperature at which it can be alkalized without precipitating chromium containing compounds. Precipitation of an oxide reaction product of chromium, capable of yielding the desired active catalyst, is thereafter effected conveniently in a rapid continuous manner by alkalizing the cooled stabilized stream and subsequently raising the temperature of the alkalized, stabilized stream to a temperature at which precipitation will be brought about.

In the continuous process in accordance with my invention all materials charged to any part of the system, to constitute the alkalized stabilized stream of chromium containing solution, are controlled as to concentration so that the concentration of chromium in the alkalized stabilized stream being heated to precipitation temperature will be maintained low enough to avoid the formation of a jelly during, or subsequent to, the precipitation operation of the process.

The formation of the initial stream of aqueous solution containing chromium comprising the stabilizer is not limited to any specific method. Thus I may form into a continuous stream an aqueous solution of a chromium compound which has inherently the requisite constituents for the formation of the stabilized solution. Suitable compounds are chromium salts of weak acids, for example, chromium acetate, of which the acetate radical is capable of functioning as the stabilizer. Or, I may continuously add to an acidic aqueous stream of solution of chromium a stabilizer for the metal.

In a preferred method of carrying out the continuous process an acidic aqueous solution of chromium, for example, an aqueous chromium nitrate solution, is charged in continuous stream to a mixing zone. To this stream there is continuously added a stabilizer for said chromium, for example: weakly ionized acids, such as acetic, formic, succinic acid, or the salt of a weakly ionized acid such as sodium acetate, ammonium acetate, etc. The stabilizer is added in sufficient amount to delay, but not inhibit, precipitation of chromium containing compounds upon alkalization of the stabilized solution at normal temperature. The acidic aqueous solution of chromium and the added stabilizer is drawn in continuous stream from the mixing zone and raised to an elevated temperature to complete in a short period of time, for example, not exceeding about one minute, the stabilization which would require a prolonged period of time extending over many hours at a lower temperature.

The hot stabilized stream leaving the heating zone is cooled by passage through a cooling zone. To the stream of cooled stabilized solution there is continuously added an alkaline solution capable of substantial ionization, such as for example, sodium hydroxide or ammonium hydroxide. The alkaline solution is continuously added to the stream of cooled stabilized solution in amounts which will render the resulting mixed stream slightly alkaline. The stream of alkalized solution is thereafter raised to an elevated temperature at which chromium will precipitate therefrom as a gelatinous chromium oxide reaction product substantially free of occluded salts, by continuous passage of the stream through a second heating zone. Thereafter the gelatinous chromium oxide reaction product is continuously separated from the stream comprising the remaining solution from which it has been precipitated. The resultant gelatinous chromium oxide product is washed and dried in a continuous manner to yield a desired catalytic material.

The quantity and concentration of the reagents charged to the continuous process of the invention are controlled in such wise that the concentration of chromium in the cooled, alkalized, stabilized stream passing into the second heating zone will be below that concentration which will cause the formation of a jelly within the second heating zone. To aid in maintaining the proper concentration of chromium in the stream entering the second heating zone water from an outside source may be introduced as a diluent into the stream in controlled amounts, preferably at a point intermediate the outlet of the first heating zone and the inlet to the second heating zone.

In accordance with the continuous process of the invention the heat content of the effluence from the primary heating zone is utilized to preheat the cool charge to the primary or secondary heating zone. Similarly the continuous process permits the utilization of the heat content of the hot stream leaving the secondary heating zone to preheat the cool charge entering the primary or secondary heating zone.

The process for the continuous preparation of catalytic material in accordance with my invention will be more fully understood with reference to the accompanying drawing in which Fig. 1 illustrates diagrammatically a specific form of apparatus suitable for carrying out my invention and in which Fig. 2 illustrates an alternative method of completing the preparation of the catalytic material from the gelatinous chromium oxide reaction product produced in accordance with the process of my invention.

An acidic aqueous solution of chromium, for example, an aqueous solution of chromic nitrate, is drawn from a suitable storage tank 1, by means of pump 3, and forced through line 2, controlled by valve 4, and line 5 into a suitable mixing zone. The mixing zone may consist of any suitable mixing device such as, for example, a tower 6, provided with baffles or trays. Though I have chosen chromium nitrate as a preferred illustrative example of the chromium compound suitable for the production of catalytic material in accordance with the continuous process of my invention, the invention is in no wise limited to this compound and a variety of chromium compounds can suitably be used. The acidic aqueous solution used as the initial charge to the system may, for example, consist of an aqueous solution of any suitable chromium salt, of which the more common compounds, comprising a chromium and a radical of a strong mineral acid, such as chromium chlorides, nitrates and sulphates are merely mentioned as illustrative examples.

A stabilizing agent capable of stabilizing the chromium containing solution by delaying, but not inhibiting, precipitation of the metal from its solution when the solution is rendered alkaline, is drawn from a suitable source of supply 7 and forced through line 8 controlled by valve 9, by means of pump 10, into line 5 wherein the stabilizer commingles with the chromium containing solution passing to the mixing tower 6.

As stabilizing agents any compounds may be used which will delay precipitation of chromium containing compounds from the acidic aqueous solution of the metal when this solution of the metal is made alkaline. Suitable stabilizing agents are the weakly ionized acids such as, for example, formic, acetic, succinic, citric, tartaric acids and the salts of these acids, as, for example, sodium or ammonium acetate. Compounds of a strong base and a strong acid will in certain instances function as stabilizers. Potassium sulphate, for example, will function as a stabilizer for chromium in a chromium nitrate solution. I have chosen ammonium acetate as a preferred illustrative example of a stabilizer for the chromium nitrate solution used in the present illustrative description of the process of my invention.

The stabilizer is preferably added as a solution but may however be added to the acidic aqueous stream of the metal as a suspension, slurry or even as a solid. The amount of stabilizer added should be sufficient to effectively stabilize the aqueous metallic salt solution and is dependent upon the concentration and chemical properties of the particular acidic aqueous solution and of the stabilizer charged to the system. When charging a solution of chromium nitrate to the system, it has been found that a weight of ammonium acetate two and one-quarter to four times that of the weight of chromium in the acidic aqueous chromium solution is required to stabilize the acidic aqueous chromium solution.

The aqueous chromium nitrate solution with the added ammonium acetate solution is passed through mixing tower 6, wherein a thorough agitation of the solution effects substantially uniform distribution of the components throughout the solution. The solution comprising the dissolved chromic nitrate and the ammonium acetate stabilizer is continuously drawn from the bottom of the mixing tower 6, and forced by means of pump 11, into line 12, controlled by valve 13. By closing valve 13 the stream flowing through line 12 is caused to flow through line 14, controlled by valve 15, into a loop conduit 16. Valves 17 and 18 and an indirect heat exchanger 19 are positioned in loop conduit 16. By closing valve 17 and opening valve 18 the stream flowing through line 14 into loop conduit 16 is passed through indirect heat exchanger 19 wherein it is preheated. The preheated stream leaving indirect heat exchanger 19 continues through loop conduit 16 and passes through line 20 controlled by valve 21 into line 22 provided with valve 23. By closing valve 23 the stream of solution comprising dissolved chromic nitrate and the ammonium acetate stabilizer is continuously passed from line 22 into a heated stabilizing zone.

The heated stabilizing zone should preferably consist of an elongated, externally heated zone of restricted cross sectional area. Such a zone, in addition to enabling the stream to be brought more rapidly to the stabilizing temperature, has the advantage, due to the more rapid flow therethrough and consequent mixing effect, of avoiding the formation of concentration layers, thus assuring uniform distribution of components of the solution throughout the stream during the stabilization process. The use of an elongated externally heated zone of restricted cross sectional area as the stabilizing zone therefore assures the quick and thorough stabilization of the solution, essential to the rapid and continuous production of the catalyst made possible by my invention.

The heated stabilizing zone may consist of an externally heated coil, for example, a coil 24 immersed in a heating medium contained in an insulated container, or tank 25. The heating medium may suitably be water, oil, steam, or any other fluid capable of being used for such purpose. Heating coil 26 is used to maintain the heating fluid at the desired temperature. Optionally the heating fluid may be circulated to an external source of heat, not shown on the drawing, and suitable appliances for maintaining circulation and temperature control, not shown in the drawing, may be resorted to.

Within stabilizing coil 24 the solution comprising dissolved chromic nitrate and ammonium acetate as stabilizing agent, is heated to an elevated temperature, to effect stabilization of the chromic nitrate solution. It is believed that in this phase of the process an unstable, complex chromium compound, comprising chromium, hydroxide and acid radicals formed upon solution of the chromium nitrate, is converted to a complex compound, comprising chromium, hydroxide radicals and the weak acid radical derived from the added stabilizer, which complex is stable with respect to precipitation in the cold from the solution upon alkalization. The process in accordance with my invention is, however, not limited to any particular theory of the mechanics of the chemical reaction taking place in this step of the process. The temperature of the heating medium in tank 25 is controlled in such wise that the stream flowing through stabilizing coil 24 will be heated to that temperature most favorable to the formation of the complex compound which is stable with respect to precipitation at normal temperatures from the solution upon alkalization, for example, about 212° F.

The hot stream of stabilized aqueous chromium nitrate-ammonium acetate solution leaving stabilizing coil 24, flows through line 27, to indirect heat exchanger 19, wherein it is subjected to indirect heat exchange with the stream of cold solution flowing through loop conduit 16. The partially cooled stabilized aqueous chromium nitrate-ammonium acetate solution is passed from heat exchanger 19, through line 28 into a cooling zone.

The cooling zone should preferably consist of an elongated zone of restricted cross sectional area to permit of a quick and continuous cooling of the stream essential to the rapid and continuous production of the catalyst made possible by my invention.

The cooling zone may consist of a coil 29, positioned in a container, or tank, 30, containing a cooling fluid and optionally a cooling coil 31. Inlet 32 and outlet 33 are provided for introduction and withdrawal respectively of the cooling fluid.

In cooling coil 29, the partially cooled stream of stabilized chromium nitrate-ammonium acetate solution is further cooled, preferably to a temperature below 100° F., for example about 70° F. The cold stabilized chromium nitrate-ammonium acetate solution passes from cooling coil 29, through line 34, controlled by valve 35, into loop conduit 36.

From a suitable source 37, a precipitant for the chromium in the cold stream of chromium nitrate-ammonium acetate solution, for example ammonium hydroxide, is continuously drawn by means of pump 38, and forced through line 39 into the cold stream of stabilized chromium nitrate-ammonium acetate solution passing through line 34. Other suitable hydroxides can be used as alkalizing agents as, for example, sodium or potassium hydroxides. The amount of alkalizing agent added to the chromium nitrate-ammonium acetate solution should be sufficient to render slightly alkaline the cold stabilized chromium nitrate-ammonium acetate solution.

Valves 40 and 41 and indirect heat exchanger 42 are positioned in loop conduit 36. By closing valves 41, 13 and 23 and opening valve 40 the cold stream of alkalized, stabilized chromium nitrate-ammonium acetate solution flowing through loop conduit 36 is passed into indirect heat exchanger 42 wherein it is preheated. The preheated stream leaving indirect heat exchanger 42 continues through loop conduit 36 and flows through line 43, controlled by valve 43a, into a heated precipitating zone.

The heated precipitating zone should preferably consist of an externally heated elongated zone of restricted cross sectional area. Such a zone enables the stream to be brought more rapidly to elevated temperature and the more rapid flow therethrough, and consequent mixing effect, assures the distribution of the components of the solution throughout the stream during the precipitation process, thus making possible a more thorough, uniform, rapid and continuous precipitation operation than could be achieved with zones of larger cross sectional areas.

The heated precipitating zone may consist of an externally heated coil 44 suitably positioned together with the stabilizing coil 24 in the common tank 25, containing a suitable heating fluid. Optionally the stabilizing and precipitating coils may be positioned in separate tanks of heating fluid. This is particularly desirable where heating fluid of different temperatures are desired to be maintained about the stabilizing and precipitating coils.

Within externally heated precipitating coil 44 the stream of alkalized chromium nitrate-ammonium acetate solution is heated to an elevated temperature, for example about 212° F., to effect precipitation therein of substantially all of the chromium from the alkalized chromium nitrate-ammonium acetate solution as the corresponding gelatinous oxide reaction product.

As pointed out above, the stabilizing and precipitating coils may be positioned in separate tanks of suitable heating fluid. When particular reagents or conditions of operation favor such separation of the stabilizing and precipitating heating zones the temperature to be maintained in the latter will be that most favorable to effective precipitation of substantially all of the metal from the stream of alkalized stabilized solution of the metal flowing through the precipitating coil.

To insure that the reaction within precipitating coil 44 does not result in the formation of a jelly with resultant clogging of coil 44 and subsequent piping, it is essential that the concentration of the stream of alkalized chromium nitrate-ammonium acetate solution entering coil 44 be such as to have a chromium content of less than six grams per liter of the alkalized chromium nitrate-ammonium acetate solution. Such concentration may easily be maintained by control of the concentration of the aqueous chromium salt solution in 1, or the concentration of the stabilizer in 7, or the concentration of the alkalizing agent in 37, or by the control of two or all three of these solutions. Optionally the proper concentration of chromium in the alkalized chromium nitrate-ammonium acetate solution entering precipitating coil 44 may be maintained by the addition of a diluent to the system, preferably at a point between the outlet of stabilizing coil 24 and the entrance to precipitating coil 44. A diluent, for example water, drawn from an outside source through line 45, controlled by valve 46, may be introduced into line 34 at a point upstream from the point of discharge of line 39 in line 34.

The hot stream, leaving precipitating coil 44, comprising the gelatinous chromium oxide reaction product and the solution from which it was precipitated, passes through line 47 to heat exchanger 42 wherein it is cooled by indirect heat exchange with the cold alkalized chromium nitrate-ammonium acetate solution passing through loop conduit 36. From heat exchanger 42 the cooled stream comprising the gelatinous chromium oxide reaction product and the solution from which it was precipitated is passed through line 48 to centrifuge 49.

In accordance with the continuous process of the invention the system of indirect heat exchange resorted to, to preheat the charge to stabilizing coil 24 and precipitating coil 44 is not limited to that comprised in the foregoing illustrative example. Thus the form of apparatus illustrated diagrammatically in the drawing permits of a variation of flow whereby the hot products leaving stabilizing coil 24 are subjected to indirect heat exchange with the cool products passing from cooling coil 29 to precipitating coil 44, and the hot products leaving precipitating coil 44 are subjected to indirect heat exchange with the cold charge to stabilizing coil 24.

In this modification of form of carrying out the continuous process in accordance with the invention valve 15 is closed and valve 13 is opened thereby passing the stream of dissolved chromic nitrate and the ammonium acetate stabilizer into loop conduit 36. By closing valves 40, 35 and 43a and opening valve 41, the stream entering loop conduit 36 from line 12 passes through loop conduit 36 into indirect heat exchanger 42 wherein it is subjected to indirect heat exchange with hot products emanating from precipitating coil 44 through line 47. The preheated stream of chromic nitrate ammonium acetate solution leaving indirect exchanger 42 continues through loop conduit 36, and line 22 to stabilizing coil 24, valve 23 being open and valve 21 being closed.

Valve 35, being closed, the stream of alkalized chromium nitrate-ammonium acetate solution flowing through line 34 is passed through line 50 controlled by valve 51 into loop conduit 16. By opening valve 17, valves 15 and 21 being closed, the stream is passed through loop conduit 16 into indirect heat exchanger 19 wherein it is subjected to indirect heat exchange with hot products emanating to indirect heat exchanger 19 from stabilizing coil 24 through line 27. The preheated stream of alkalized chromium nitrate-ammonium acetate solution leaving indirect heat exchanger 19 continues through loop conduit 16, line 52 controlled by valve 53, and line 43 into precipitating coil 44.

In centrifuge 49 the greater part of the remaining solution is separated from the gelatinous chromium oxide reaction product and eliminated from the system through line 54. The remaining stream comprising gelatinous chromium oxide reaction product is passed from centrifuge 49, through line 55, into a tank 56 wherein the precipitate is washed with a suitable washing medium, for example hot water, which is introduced through line 57 controlled by valve 58, at a point above that of introduction of the chromium hydroxide reaction product. Excess wash water is withdrawn from the upper part of the tank 56 through line 59 controlled by valve 60.

From the bottom of tank 56 a slurry, comprising the gelatinous chromium oxide reaction product and water, is drawn and forced by means of pump 61 through line 62 into a second centrifuge 63 wherein wash water, comprising dissolved impurities washed out of the gelatinous chromium oxide reaction product is separated and eliminated from the system through outlet 64.

The washed gelatinous chromium oxide reaction product separated in centrifuge 64, passes as a slurry through line 65, controlled by valve 66, into a mixing chamber 67. Finely divided material capable of functioning as a support and mechanical strengthener for the final catalytic product is passed from hopper 68 through passage 69 into mixing chamber 67. Suitable material capable of acting as a support for the final catalyst may include a wide variety of materials, for example, quartz, asbestos, clay, pumice, coke, charcoal, silica, alumina, etc. In addition to one or more such supports, there may be added to the gelatinous chromium oxide reaction product in mixing chamber 67, materials capable of acting as promoters for the final catalytic mass. Mixing chamber 67 is equipped with a suitable stirrer 70, driven by means not shown in the drawing, to effect the thorough mixing of the gelatinous chromium oxide reaction product and the added supporting material.

The mixed gelatinous chromium oxide reaction product and supporting material are continuously passed from mixing chamber 67 by suitable conveying means 71, for example, a belt or screw-conveyor or the like, into a dryer 72. If desired, the gelatinous chromium oxide reaction product, separated as a slurry in centrifuge 63, may be passed directly to dryer 72 by means of line 73 controlled by valve 74.

In dryer 72 the mixed gelatinous chromium oxide reaction product and supporting material passed thereto from mixer 67 by conveying means 71, or if mixer 67 is not used the chromium oxide reaction product passed thereto through line 73, is dried at elevated temperatures not exceeding that temperature at which the desired catalytic characteristics of the final catalytic mass would be destroyed. A temperature not exceeding about 850° F. and preferably about 600° F. is maintained in the drying operation effected in dryer 72. Optionally, drying may be effected in the absence of air, in an inert atmosphere.

In dryer 72 the gelatinous chromium oxide reaction product with the added supporting material is dried to yield a final product of high catalytic activity which is continuously drawn from the system by means of a suitable conveying means 75, such as an endless belt, screw conveyor or the like. If mixing chamber 67 is not used and only the chromium oxide reaction product without added supporting material is passed into dryer 72 through line 73, the gelatinous chromium oxide reaction product is converted in dryer 72 to a hard, black, vitreous material of high catalytic activity which is continuously drawn from the system by means of conveying means 75.

The method of separating the gelatinous chromium oxide reaction product from the remaining solution and washing it as described in the illustrative example above is but one of the many ways in which such separation and washing can be effected before drying the gelatinous mass to form the desired catalytic product, and the process of preparing the catalyst in accordance with the process of my invention is in no wise limited by any specific method of separating the gelatinous metal oxide reaction product from the solution and washing it.

A suitable modification of the separating, washing and drying steps of the process is illustrated in Fig. 2 of the drawing wherein the gelatinous chromium oxide reaction product and solution from which it has been precipitated passing through line 48', identical with line 48 of Fig. 1, is passed to a settling tank 76. In settling tank 76, the gelatinous chromium oxide reaction product settles to the bottom and supernatant solution, comprising the solution from which the chromium oxide product has been precipitated, is continuously withdrawn from the upper part of tank 76, through outlet 77, controlled by valve 78. A slurry comprising gelatinous chromium oxide reaction product is drawn continuously from the lower part of tank 76, and forced by means of pump 79, through line 80 and line 81 controlled by valve 82, into mixing chamber 83 provided with suitable mixing means 84. In mixing chamber 83 the slurry comprising the gelatinous chromium oxide reaction product is mixed with a suitable support entering chamber 83 from hopper 85 through passage 86. The support is preferably one which will function as a filter aid in a subsequent filtering stage.

The mixture comprising the gelatinous chromium oxide reaction product and supporting material is passed by means of suitable conveying means 87, for example a belt or screw conveying device, to a filter 88. Filter 88 may be of any suitable type, as for example the circular drum type wherein the filter catalyst may be sprayed by a washing medium during the filtration process. Filtrate, comprising solution from which the chromium was precipitated, and washing medium is drawn from filter 88 through line 89. The mixture of gelatinous chromium oxide reaction product and supporting material is passed by means of suitable conveying means 90, for example a belt or screw conveying device, from filter 88 to dryer 91. In dryer 91 the gelatinous chromium oxide reaction product and supporting material is dried to yield the catalytic mass which is drawn from dryer 91 by means of suitable conveying means 92.

If it is desired to produce a final catalytic material without added supporting or activating material, valve 82 may be closed and the slurry comprising gelatinous chromium oxide reaction product passing through line 80, forced through line 93, controlled by valve 94, directly to filter 88. The chromium oxide reaction product, without added support, leaving filter 88 is passed into dryer 91 by means of conveying means 90. In dryer 91 the chromium oxide reaction product without the added support is converted into a desired hard, vitreous, black, catalytic mass which is continuously drawn from dryer 91 by means of conveying means 92.

*Example I.*—To a continuous stream of 0.6 molar aqueous solution of chromic nitrate, having nine molecules of water of crystallization, passing into mixing chamber 6, there is continuously added a 2 molar aqueous solution of ammonium acetate as stabilizer for the aqueous chromic solution. The ratio of the volume of the ammonium acetate stabilizer solution to that of the aqueous chromic nitrate solution is 1 to 4.

The chromic nitrate-ammonium acetate solution is thoroughly mixed in the mixing chamber 6, then preheated in indirect heat exchanger 19 and continuously passed into the externally heated stabilizing coil 24, wherein it is brought to a temperature of 200° F. The hot stabilized chromic nitrate-ammonium acetate solution is then cooled by indirect heat exchange in indirect heat exchanger 19, with the cool charge entering the stabilizing coil 24. The partially cooled stabilized chromic nitrate-ammonium acetate solution is further cooled to 70° F. by passage through cooling coil 29. To the cooled stream of stabilized chromic nitrate-ammonium acetate solution leaving cooling coil 29 there is continuously added a 3% solution of ammonium hydroxide. The ratio of the volume of aqueous ammonia added to the volume of stabilized chromic nitrate-ammonium acetate solution is 2 to 5. The alkalized chromic nitrate-ammonium acetate solution is then preheated in indirect heat exchanger 42 and passed into externally heated precipitating coil 44 wherein it is raised to a temperature of 200° F. to effect substantially complete precipitation of the chromium from the solution as the corresponding gelatinous chromium oxide reaction product. The stream of gelatinous chromium oxide precipitate and the solution from which it is precipitated leaving the precipitating coil 44 is cooled by indirect heat exchange in indirect heat exchanger 42 with the alkalized chromic nitrate-ammonium acetate solution passing to precipitating coil 44. The gelatinous chromium oxide reaction product is continuously separated from the solution from which it has been precipitated and washed. The washed gelatinous chromium oxide reaction product is dried in dryer 72 at a temperature of about 212° F. which is gradually raised as the drying progresses to a temperature of 600° F., yielding a black vitreous mass of high catalytic activity.

Many modifications and variations of the invention as herein set forth may be made without departing from the spirit and scope thereof and therefore only such limitations should be imposed as are indicated in the appended claims.

I claim:

1. A continuous process for preparing a chromium oxide catalyst by reaction of a chromium compound and an alkaline reagent in aqueous solution to precipitate a gelatinous chromium oxide reaction product which comprises forming a flowing stream consisting of an aqueous solution containing a chromium salt and a compound containing the acid radical of a weakly ionized acid, said last-mentioned compound being present in an amount sufficient to stabilize said solution to a degree whereby after said solution has been boiled and after said boiled solution has been alkalized chromium compounds are not readily precipitated therefrom at room temperature but are readily precipitated at the boiling temperature, heating said flowing stream at substantially the boiling temperature to stabilize said solution against ready precipitation of chromium compounds at room temperature by alkalization, cooling said stream of stabilized solution, continuously adding to the stream of cooled stabilized solution an alkaline reagent in amounts sufficient to render the solution alkaline, continuously heating the said stream of alkalized stabilized solution to a temperature approximately at the boiling temperature to effect precipitation of a gelatinous reaction product of said chromium and said alkaline reagent, continuously separating said gelatinous reaction product from said flowing stream, and drying said separated gelatinous reaction product to convert it into a catalytic material.

2. A process in accordance with claim 1 wherein the concentration of chromium in said flowing stream of alkalized solution, prior to heating said alkalized solution to the boiling temperature, is limited to at most six grams per liter.

3. A process in accordance with claim 1 wherein said stream comprises an aqueous solution of a chromium salt of a weakly ionized acid.

4. A process in accordance with claim 1 wherein said stream consists of an aqueous solution of a chromium salt and ammonium acetate.

5. A continuous process for preparing a chromium oxide catalyst by reaction of a chromium compound and an alkaline reagent in aqueous solution to precipitate a gelatinous chromium oxide reaction product which comprises forming an aqueous solution of a chromium salt and a compound containing the acid radical of a weakly ionized acid, said last-mentioned compound being present in an amount sufficient to stabilize said solution to a degree whereby after said solution has been boiled and after said boiled solution has been alkalized chromium compounds are not readily precipitated therefrom at room temperature but are readily precipitated at the boiling temperature, continuously passing said solution through an elongated externally heated zone of restricted cross-sectional area to heat said solution to a temperature substantially at the boiling temperature to stabilize said solution against ready precipitation at room temperature by alkalization thereof, continuously passing said stabilized solution through a cooling zone to cool said solution to a temperature at which precipitation of chromium compounds is not effected readily by alkalization thereof, continuously adding to said cooled solution an alkaline reagent in amounts sufficient to render the solution alkaline, passing said alkalized solution through a second elongated externally heated zone of restricted cross-sectional area to heat said alkalized solution to a temperature substantially at the boiling temperature to effect precipitation of a gelatinous chromium oxide reaction product of chromium and said alkaline reagent, limiting the concentration of chromium in said alkalized solution entering said second heating zone to at most six grams per liter of solution to maintain the fluidity of said stream after said precipitation, withdrawing said solution and the precipitate contained therein from said second heating zone, separating from said solution said gelatinous reaction product, and drying said gelatinous reaction product to convert it into catalytic material.

6. A process in accordance with claim 5 wherein said aqueous solution prior to stabilization thereof is heated at least in part to the stabilizing temperature by indirect heat exchange thereof with the heated stabilized solution leaving the first-mentioned heating zone.

7. A process in accordance with claim 5 wherein said aqueous solution prior to stabilization thereof is heated at least in part to the stabilizing temperature by indirect heat exchange with said heated solution leaving the second heating zone.

8. A process in accordance with claim 5 wherein said cooled alkalized solution is heated at least in part to the precipitating temperature by indirect heat exchange thereof with said heated solution leaving said first-mentioned heating zone.

9. A process in accordance with claim 5 wherein said cooled alkalized solution is heated at least in part to the precipitating temperature by indirect heat exchange thereof with said heated solution leaving said second heating zone.

ROBERT F. RUTHRUFF.